United States Patent Office 2,775,311
Patented Dec. 25, 1956

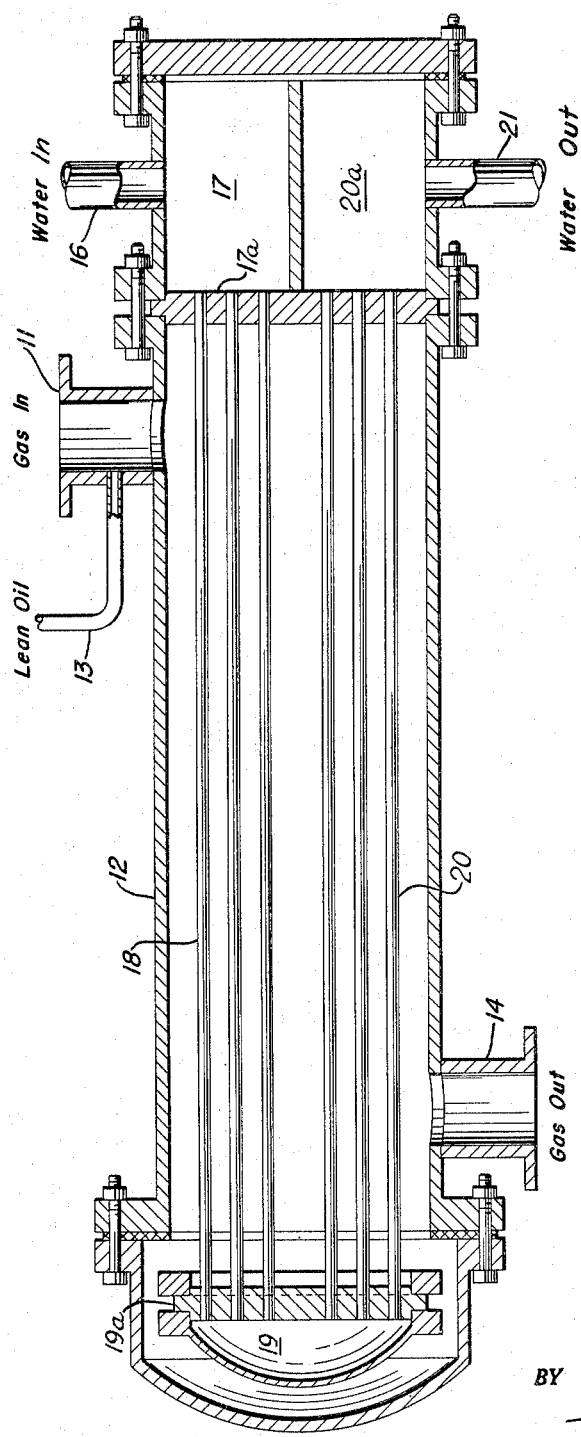

2,775,311

SULFUR REMOVAL IN GAS COOLING

Wallace E. Voreck, Jr., Chicago, Ill., assignor to Standard Oil Company, Chicago, Ill., a corporation of Indiana Application September 26, 1955, Serial No. 536,383

4 Claims. (Cl. 183—120)

This invention relates to the cooling of gases containing free-sulfur. More particularly it relates to maintaining the cooling efficiency of the heat exchanger cooling said gas.

Gas streams which contain hydrogen sulfide, low boiling mercaptans and other sulfur bodies often also contain free-sulfur which is the result of the oxidation of the sulfur bodies with free-oxygen which is bled into the gas stream from the atmosphere. As long as the gas stream is at a temperature such that the sulfur is in the vapor state, no difficulties are presented by the presence of the free-sulfur in the gas stream. However, when this gas stream is cooled to a temperature below the solid point of the sulfur, the sulfur is condensed and coats the cool surface and thereby impairs the cooling effectiveness of the heat exchange surface. The melting point of elemental sulfur is about 230° F. The boiling point of sulfur is about 830° F. Of course, the sulfur may exist in the gas stream in the form of a very fine dispersion of molten droplets which are collected by the heat exchange surface. Since the cooling of a gas stream involves a gas interface wherein naturally efficiency is low, any impairment of the heat transfer ability of the exchange surface by a sulfur coating is a serious problem.

An object of the invention is a process for maintaining the cooling effectiveness of heat exchangers in gas cooling service wherein the gas stream contains elemental sulfur. Another object is a process for maintaining the cooling effectiveness of heat exchangers in refinery service on wet gas streams containing sulfur bodies. Other objects will become apparent in the course of the detailed description.

The process of the instant invention involves the introduction of a liquid hydrocarbon oil into the gas stream immediately prior to the introduction of the gas stream into the heat exchanger which is troubled with free-sulfur deposition. Sufficient liquid hydrocarbon oil is introduced to dissolve the sulfur deposits and to maintain the heat exchange surface essentially sulfur-deposit free. A liquid hydrocarbon stream containing the dissolved sulfur is withdrawn from the heat exchanger.

The process is applicable to any gas stream which contains hydrogen sulfide and other sulfur bodies and sufficient free-oxygen to form free-sulfur by oxidation of the hydrogen sulfide or other sulfur bodies, which gas stream has to be cooled at some point to a temperature below the melting point of free-sulfur. The gas stream might be a methane-ethane-rich stream suitable for natural gas use. Or it may be a stream of gas from a well which contains methane, ethane, propane and condensables. Or it may be a refinery wet gas stream derived from hydrocarbon conversion processes, such as thermal cracking, catalytic cracking or coking. This wet gas stream contains large amounts of propane, butanes and some pentanes, in addition to methane and ethane; also, this stream contains large amounts of hydrogen sulfide and some low boiling mercaptans. Another source is the so-called butane-butylene stream produced from refining operations, which stream contains H₂S and low boiling mercaptans.

The liquid hydrocarbon oil which is utilized to dissolve the sulfur deposits may be any hydrocarbon oil which has appreciable solvent power for free-sulfur at the temperatures existing in the coated heat exchanger. Also, the liquid hydrocarbon oil should have a boiling point high enough so that it is maintained in the liquid state in the heat exchanger without excessive pressure and also that it may be readily separated by distillation from the condensables boiling in the butane and pentane range which exist in wet gas streams. Paraffinic hydrocarbons, such as hexane, heptane, octane and naphthas will dissolve from about 0.1 to about 0.4 weight percent of free-sulfur at ordinary temperatures such as 70° F. to 100° F. The aromatic hydrocarbons will dissolve considerably more free-sulfur, for example, toluene will dissolve as much as 1% at these ordinary temperatures. For this reason it is preferred that the liquid hydrocarbon oil be a petroleum distillate rich in aromatic hydrocarbons. Such a distillate is readily obtained from a catalytic cracking operation. In general, the liquid hydrocarbon oil utilized herein will boil from about 250° F. to 700° F. It is preferred to operate, on refinery wet gas operation, with an oil which boils over the range of about 325° F. to about 600° F.

Sufficient liquid hydrocarbon oil must be utilized to dissolve the sulfur deposits about as rapidly as they are formed. Obviously the amount of oil introduced will depend upon the solvent power of the oil for free-sulfur at the particular temperature of operation. In general, when operating with a petroleum distillate boiling in the heavier-than-naphtha range, between about 500 and 2000 pounds of oil will be used per pound of free-sulfur present in the gas stream, which free-sulfur is deposited on the heat exchange surface.

All of the information given herein with respect to the properties of the sulfur and its solubilities are taken from the Sulfur Data Book, William N. Tuller, editor, 1954 (McGraw-Hill Book Company).

The process of the instant invention is described in connection with the annexed figure which is made a part of this specification and disclosure. The annexed figure shows more or less schematically a shell and tube heat exchanger which is in gas cooling service. It is to be understood that this particular embodiment is illustrative only and does not limit the scope of the invention.

In this embodiment, the heat exchanger is in refinery service on a refinery wet gas stream. In this embodiment, about one-half million standard cubic feet of refinery wet gas are processed per hour. This wet gas has an approximate composition of about 40 mole percent methane and ethane, about 20 mole percent of propane and propylene, and about 40 mole percent of butane, butylene and pentanes. The stream contains considerable amounts of H₂S and methylmercaptan. Also, the stream contains free-oxygen from air which enters into the stream inadvertently. The wet gas has been passed through a gas compressor not shown and raised to a temperature of about 250° F. and a pressure of about 60 p. s. i. g. immediately prior to entry into conduit 11 which leads to the shell side of heat exchanger 12. Refinery-lean oil which is used for absorption of propane and butane from the gas stream in a subsequent operation is the liquid hydrocarbon oil used herein. This particular lean oil boils over the range of 350° F. to 580° F. The lean oil is introduced by way of conduit 13 into conduit 11 at a point just before the junction of conduit 11 and the shell of heat exchanger 12. In this embodiment, about 15 barrels (42 gal.) of lean oil are injected per hour. The gas stream and lean oil pass into the shell side of heat exchanger 12 and the entire stream of cooled gas and lean oil-containing dissolved sulfur and hydrocarbon condensate are withdrawn from the heat exchanger by way of conduit 14. The liquids are separated from the gas in a gas separator drum not shown. The lean oil is then separated from the butane-pentane condensate by a distillation operation not shown. In this embodiment, about one-half of the condensables present in the wet gas stream are condensed in heat exchanger 12 and are passed out of the heat exchanger as condensate.

Cooling water is passed by way of conduit 16 into chamber 17. Fixed header 17a is perforated for the heat exchange tubes. Water passes from chamber 17 through tubes 18, etc. into chamber 19. The heat exchange tubes pass through floating header 19a. In chamber 19, the direction of flow of the water is changed 180°; the water passes through tubes 20, etc. into chamber 20a and is discharged from the exchanger by way of conduit 21.

*Example*

In a refinery operation on the scale of that described above, considerable difficulty was had with sulfur deposition on the tubes of the gas coolers and frequently runs on the units were determined by the decrease in heat exchange efficiency rather than by need for maintenance of equipment. After operation utilizing the liquid hydrocarbon oil injection procedure of this invention was begun, the heat transfer coefficients of the gas coolers were maintained at a level approaching that of newly cleaned exchangers over a period as long as a year (a year's time is the normal operating cycle of this type of unit; at the end of a year, the unit is shut down for a routine inspection) without the gas coolers having any adverse effect on the overall gas adsorption unit operation. Inspection of the gas coolers indicated no sulfur coating on the coolers following the operation with the oil injection procedure.

It is obvious that one skilled in this art will readily devise many modifications of the invention and applications to the defined gas stream. It is to be understood that the claims herein are intended to cover broadly these modifications as well as the specific embodiment described herein.

Thus having described the invention, what is claimed is:

1. In a process wherein a gas stream containing $H_2S$ and free-oxygen in an amount sufficient to produce appreciable amounts of free-sulfur oxidation product and sulfur vapor produced by the oxidation of $H_2S$ is passed through an indirect heat exchange means whereby the stream temperature is lowered to a point below the melting point of free-sulfur, causing said free-sulfur to coat the indirect heat exchange means thereby decreasing exchanger efficiency, the improvement which comprises adding to said stream immediately prior to its entry into said heat exchange means, a liquid hydrocarbon oil, characterized by a boiling point higher than the melting point of free-sulfur, in an amount sufficient to dissolve said sulfur coating and withdrawing from said exchange means, a liquid oil stream containing said dissolved free-sulfur.

2. The process of claim 1 wherein said gas stream is a refinery wet gas stream.

3. The improvement of claim 1 wherein said oil boils between about 325° F. and 600° F.

4. The improvement of claim 3 wherein said oil is added in an amount between about 500 and 2000 pounds per pound of free-sulfur present in said gas stream.

References Cited in the file of this patent

UNITED STATES PATENTS

| | | |
|---|---|---|
| 2,675,890 | Frey et al. | Apr. 20, 1954 |
| 2,718,279 | Kraus | Sept. 20, 1955 |

OTHER REFERENCES

"Sulfur Data Book," William N. Tuller, editor, November 1954, McGraw-Hill Book Company, pages 73–91.